United States Patent
Basnayake

(10) Patent No.: US 7,957,897 B2
(45) Date of Patent: Jun. 7, 2011

(54) GPS-BASED IN-VEHICLE SENSOR CALIBRATION ALGORITHM

(75) Inventor: Chaminda Basnayake, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 1012 days.

(21) Appl. No.: 11/770,898

(22) Filed: Jun. 29, 2007

(65) Prior Publication Data

US 2009/0005985 A1    Jan. 1, 2009

(51) Int. Cl.
*G01C 21/00*    (2006.01)
(52) U.S. Cl. .................... 701/214; 701/216; 701/217
(58) Field of Classification Search .......... 701/214, 701/216, 217
See application file for complete search history.

(56) References Cited

U.S. PATENT DOCUMENTS

| | | | |
|---|---|---|---|
| 5,416,712 A * | 5/1995 | Geier et al. ................ 701/216 |
| 6,091,359 A * | 7/2000 | Geier ...................... 342/357.31 |
| 6,269,306 B1 * | 7/2001 | Ibrahim et al. .............. 701/214 |
| 6,502,033 B1 * | 12/2002 | Phuyal ...................... 701/214 |
| 6,907,347 B2 * | 6/2005 | Ibrahim et al. .............. 701/215 |
| 7,619,561 B2 * | 11/2009 | Scherzinger ............ 342/357.31 |
| 2002/0128775 A1 * | 9/2002 | Brodie et al. ................ 701/216 |
| 2002/0158796 A1 * | 10/2002 | Humphrey et al. ...... 342/357.14 |
| 2002/0169553 A1 * | 11/2002 | Perlmutter et al. .......... 701/214 |
| 2002/0198656 A1 * | 12/2002 | Ford et al. .................... 701/213 |
| 2003/0216864 A1 * | 11/2003 | Fukuda et al. ................ 701/216 |
| 2008/0234933 A1 * | 9/2008 | Chowdhary et al. ......... 701/213 |
| 2009/0005985 A1 * | 1/2009 | Basnayake .................. 701/214 |

* cited by examiner

*Primary Examiner* — Khoi Tran
*Assistant Examiner* — Brian J Broadhead
(74) *Attorney, Agent, or Firm* — John A. Miller; Miller IP Group, PLC

(57) ABSTRACT

A system and method for calibrating the bias and scale factors of a heading rate sensor, such as a yaw-rate sensor, using GPS signals. The system receives wheel speed or rotation signals, a vehicle odometer reading, GPS signals and yaw-rate signals. The system includes a wheel-slip detection processor that determines whether there is wheel-slip based on the wheel speed signals and the GPS signals. The system also includes a wheel-based acceleration processor that estimates vehicle acceleration. The system also includes a differential odometry processor that determines vehicle heading based on wheel speed. The system also includes a GPS reference data validation processor that determines whether the GPS signals are valid using the estimated vehicle acceleration and wheel speeds. The valid GPS signals are then used to calibrate the yaw-rate sensor signals, which can be used for vehicle heading purposes.

20 Claims, 2 Drawing Sheets

GPS-BASED IN-VEHICLE SENSOR CALIBRATION ALGORITHM

BACKGROUND OF THE INVENTION

1. Field of the Invention

This invention relates generally to a system and method for calibrating a heading rate sensor, such as an inertial sensor, i.e., a yaw-rate sensor, and, more particularly, to a system and method for removing sensor bias and scale factor errors from a heading rate sensor to use the sensor signals to provide an accurate vehicle heading.

2. Discussion of the Related Art

GPS signals, or other Global Navigation Satellite System (GNSS) signals, can provide accurate positioning and navigation. However, GPS receivers suffer from sky visibility-related limitations, for example, in urban canyons and areas with dense tree cover. Further, GPS signals may suffer from related multi-path errors or cross-correlation errors in such areas. Because of existing highly sensitive and fast reacquisition GPS technology, accurate GPS signals become available when sky visibility is temporarily improved for short durations, such as 10-20 seconds, even in less than optimum environments. Therefore, the continuity of GPS technology comes down to maintaining positioning accuracy through GPS outages between GPS available time windows.

Automotive-grade inertial sensors, such as yaw-rate sensors and accelerometers, have highly variable bias and scale characteristics that cause sensor drift that typically makes them un-suitable for navigation and heading determination functions without proper error correction techniques. For example, certain automotive-grade yaw-rate sensors allow up to 2 deg/sec variations for the yaw-rate sensor bias. If such a variability is not corrected, and is allowed for over a period of two minutes, a yaw-rate sensor starting with a bias of 0 deg/sec at zero seconds could reach a bias of 2 deg/sec after 120 seconds. If a linear growth of bias were assumed for simplicity, a heading change derived by integrating yaw-rate sensor signals that is not calibrated would indicate a heading change of 120° only as a result of the variation of the bias.

Inertial sensors can be used in combination with GPS receivers to provide a reasonably accurate vehicle heading, and position if a distance measure, such as vehicle wheel speeds, are available, even when the GPS signals are not available. However, automotive-grade inertial sensors do not typically provide the same level of accuracy as GPS signals. GPS/inertial sensor integrated systems can calibrate the inertial sensors and maintain vehicle heading and position accuracy using GPS signals when the GPS signals are available, and use the calibrated inertial sensors when the GPS signals are not available to maintain a heading and a position solution until the GPS signals become available again.

Known yaw-rate sensor calibration algorithms typically approach bias and scale calibration as a two-step process, and require specific vehicle maneuvers to be performed for the calibration. For example, sensor bias calibration may require the vehicle to be driven in a straight line or be stationary for a known period of time so that the accumulated yaw heading error can be directly estimated as a result of sensor bias error. For scale calibration, the vehicle may be required to be driven through a controlled turn to provide scale calibration.

SUMMARY OF THE INVENTION

In accordance with the teachings of the present invention, a system and method are disclosed for calibrating the bias and scale factors of a heading rate sensor, such as a yaw-rate sensor, using GPS signals. The system receives wheel speed or rotation signals, a vehicle odometer reading, GPS signals and yaw-rate signals. The system includes a wheel-slip detection processor that determines whether there is wheel-slip based on the wheel speed signals and the GPS signals. The system also includes a wheel-based acceleration processor that estimates vehicle acceleration. The system also includes a differential odometry processor that determines vehicle heading based on wheel speed. The system also includes a GPS reference data validation processor that determines whether the GPS signals are valid using the wheel speed and the estimated vehicle acceleration. The valid GPS signals are then used to calibrate the yaw-rate sensor signals, which can be used for vehicle heading purposes.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for providing inertial sensor bias and scale calibration to provide accurate vehicle heading readings is merely exemplary in nature, and is in no way intended to limit the invention or its applications or uses.

The present invention proposes a system and method that uses GPS signals to calibrate the scale and bias of a heading rate sensor, such as a yaw-rate sensor, to maintain the accuracy of the inertial sensor so as to allow the use of automotive-grade yaw-rate sensors for navigation, positioning, heading and enhanced vehicle stability control functions when the GPS signals are unavailable. The algorithm of the invention calibrates both bias and scale factor using the same set of data, and does not require specific vehicle maneuvers to be performed to achieve calibration. In one non-limiting embodiment, a yaw-rate and GPS heading data set at a 1 Hz or greater data rate that was 40 seconds long was used for the calibration of a yaw-rate sensor, during which a region of relative straight driving and one or more vehicle turns are identifiable.

Figure 1:
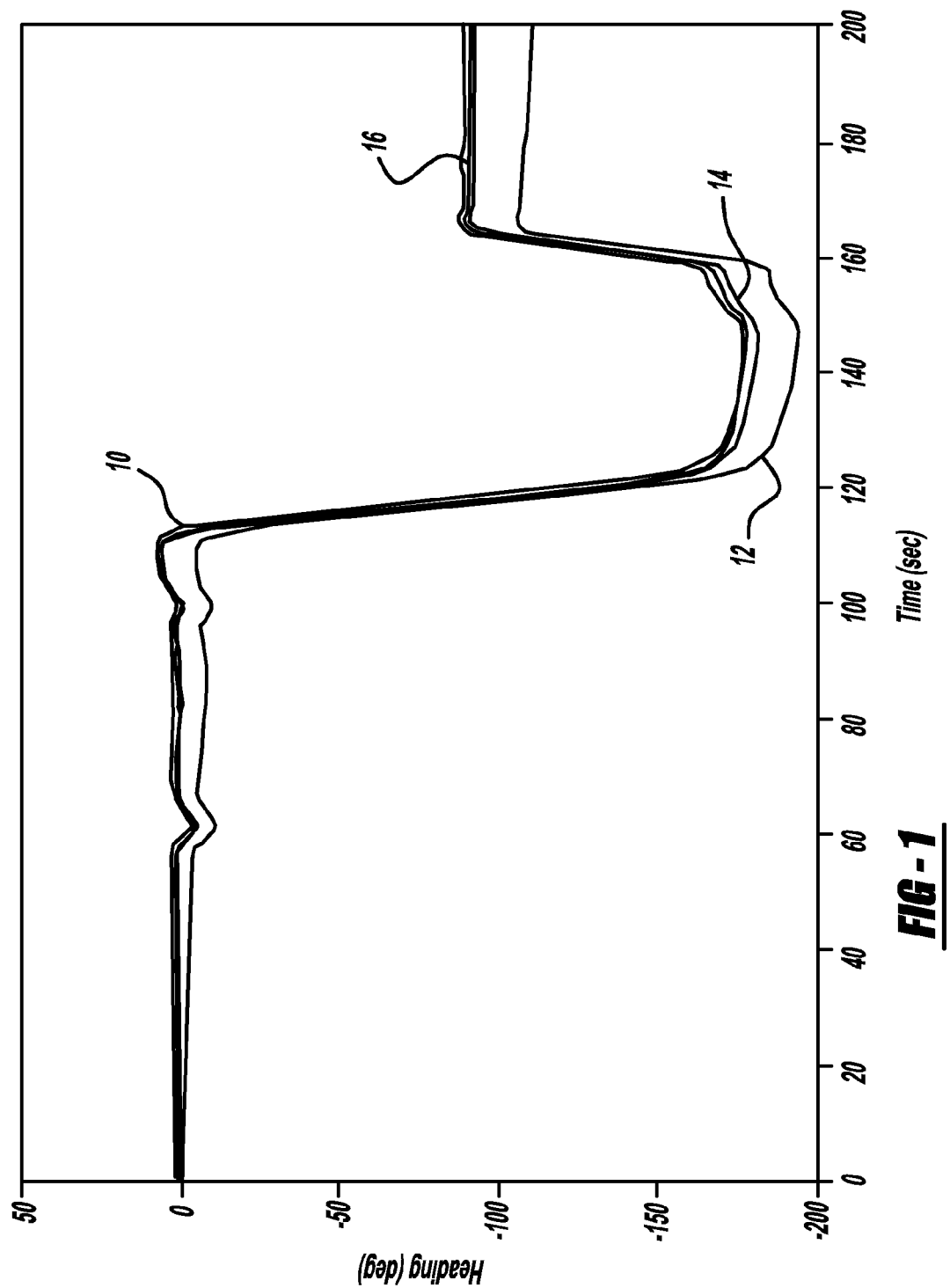
FIG. 1 is a graph with time on the horizontal axis and heading on the vertical axis including graph lines showing vehicle heading provided by GPS signals, uncalibrated yaw-rate sensor signals, bias calibrated yaw-rate sensor signals, and bias and scale calibrated yaw-rate sensor signals.

FIG. 1 is a graph with time on the horizontal axis and vehicle heading on the vertical axis that includes a graph line 10 showing vehicle heading from GPS signals and a graph line 12 showing vehicle heading for a yaw-rate sensor that has not been calibrated for bias and scale. Graph line 14 shows vehicle heading from a yaw-rate sensor that has been bias calibrated by the algorithm of the invention, and graph line 16 shows vehicle heading from a yaw-rate sensor that has been bias and scale calibrated by the algorithm of the invention.

Figure 2:
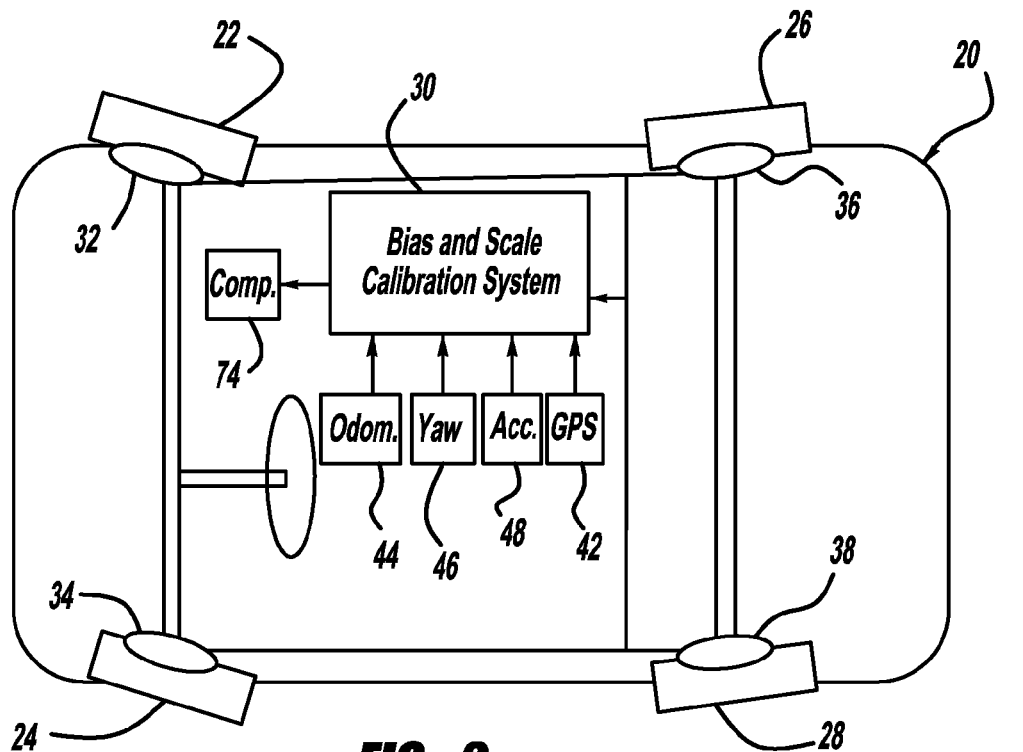
FIG. 2 is a plan view of a vehicle including a system for providing inertial sensor bias and scale calibration, according to an embodiment of the present invention.

FIG. 2 is a plan view of a vehicle 20 including front wheels 22 and 24 and rear wheels 26 and 28. The vehicle 20 also includes a bias and scale calibration system 30, according to an embodiment of the present invention. The wheels 22, 24, 26 and 28 each include a wheel speed sensor 32, 34, 36 and 38, respectively, that provide wheel speed and/or wheel rotation signals to the system 30. A GPS receiver 42 provides GPS signals to the system 30 and an odometer 44 provides vehicle odometer signals, particularly a drive shaft count, to the system 30. Additionally, the system 30 receives vehicle yaw-rate signals from a yaw-rate sensor 46 and vehicle lateral acceleration signals from a lateral acceleration sensor 48.

Figure 3:
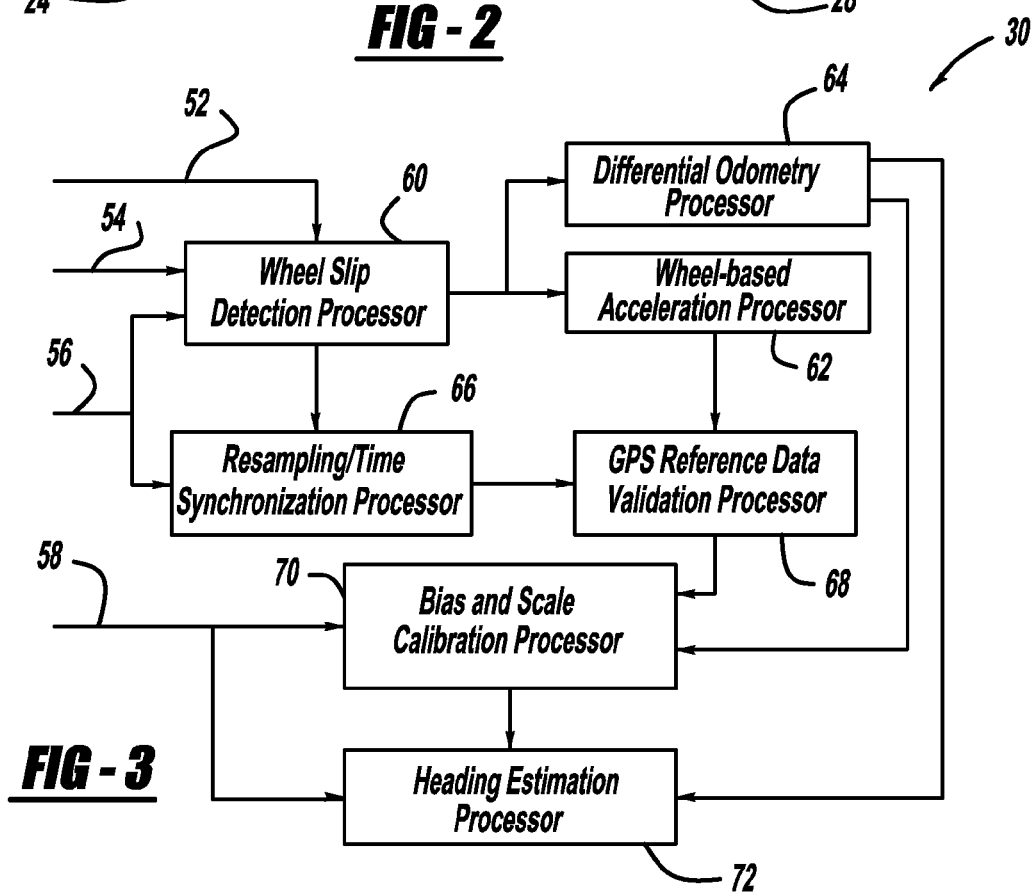
FIG. 3 is a block diagram of the bias and scale calibration system shown in FIG. 2.

FIG. 3 is a block diagram of the system 30, where the wheel speed and/or wheel rotation signals from the sensors 32, 34, 36 and 38 are provided on line 52, the odometer signals from the odometer 44 are provided on line 54, the GPS signals from the GPS receiver 42 are provided on line 56 and the yaw-rate signals from the yaw-rate sensor 46 are provided on line 58. As will be discussed in further detail below, the system 30 provides a vehicle heading estimation that can be used for any suitable purpose, such as a digital compass, vehicle navigation, vehicle stability control, etc. When the GPS signals are available, the system 30 uses those signals to provide the vehicle heading and uses the GPS signals to calibrate the bias and scale factors of the yaw-rate sensor 46. When the GPS signals are not available, the system 30 uses the previously calibrated yaw-rate signals to provide the vehicle heading. When the GPS signals are not available and the yaw-rate sensor 46 is not operating properly, then the system 30 uses wheel speed signals to estimate the vehicle heading rate using differential odometry that has been bias and scale calibrated using the calibration algorithm of the invention in the same way that the yaw-rate sensor is calibrated to provide the vehicle heading. Although it is the yaw-rate sensor 46 that is being calibrated by the system 30 for vehicle heading purposes, alternately the algorithm of the present invention for calibration can be used for any vehicle heading rate sensor, such as a differential odemetry sensor.

The validation of the accuracy of the GPS reference data is one part of the sensor calibration provided by the invention. For the invention, vehicle velocity and position estimates are considered the available GPS reference velocity data for the calibration process. Low-cost GPS receivers typically use pseudo-ranges or carrier-smooth pseudo-ranges for position estimation and Doppler effect or pseudo-range rate observations for velocity estimation. Out of all of the GPS measurements mentioned, Doppler effect observations are affected the least by multi-path errors. More importantly, multi-path errors are also the dominant error contributor for automotive navigation and positioning applications. Therefore, Doppler effect derived GPS velocities are considerably better in terms of accuracy and reliability, and availability compared to GPS position estimates.

The algorithm of the invention uses the ratio between GPS reported vehicle velocity and wheel rotator/speed to verify the accuracy of the GPS reference data. This enables a much more reliable verification without using position domain data. This verification is performed in addition to the generic GPS data validation techniques based on the number of visible GPS satellites used by the GPS receiver 42 to generate a solution and signal-to-noise ratio, satellite elevation and position estimation least square residuals of each satellite.

The system 30 includes a wheel-slip detection processor 60 that uses the wheel speed and/or wheel rotation signals from each of the sensors 32, 34, 36 and 38 on the line 52 and the GPS signals on the line 56 to detect wheel-slip and minimize the corruption of the GPS validation mechanism as a result of any of the wheels 22-28 slipping. The processor 60 serves as the primary data verification process, and uses a simple wheel velocity-to-odometer velocity ratio to determine if the wheel counts include errors as a result of wheel-slip. According to one non-limiting embodiment, the processor 60 employs a model from an algorithm based on equation (1) below to determine whether wheel-slip of any of the wheels 22-28 exists.

$$\left| \frac{v_{i,GPS}}{v_{i,sensor}} \right| \leq \delta \tag{1}$$

Where $v_{GPS}$ is GPS-based velocity, $v_{sensor}$ is wheel sensor based vehicle velocity and $\delta$ is a predetermined data quality threshold.

If the processor 60 determines that there is no wheel-slip, then the wheel speed and/or rotation signals and the odometer signals are sent to or can properly be used by a wheel-based acceleration estimation processor 62 that estimates vehicle acceleration. The estimation processor 62 uses a simple time differentiation of wheel velocity to estimate the vehicle acceleration. GPS position and velocity data streams often lag other in-vehicle data streams due to processing delays. This is especially true if filtering is implemented as a part of the GPS signal processing and estimation. Most alternative sensor enabled GPS receivers, i.e., where vehicle sensor data is used for GPS position and velocity estimation and aiding, send out trigger pulses to read vehicle data messages and subsequently combine the data with the GPS signals to provide an internally combined solution. Therefore, vehicle speed at a particular time is available through the wheel speed sensors 32, 34, 36 and 38 before the corresponding GPS speed estimate is available. Although the magnitude of this lag may vary, existing hardware and software has shown tens of milliseconds to a second of delay, the worst case being the alternative sensor enabled GPS receivers.

The processor 62 uses the estimated vehicle acceleration derived from the wheel speed sensors 32, 34, 36 and 38 to identify the speed ratio (GPS speed to wheel-based speed) variation resulting from the time lag of the GPS signals because they are highly correlated. Thus, ratio variations corresponding to GPS time lag during acceleration and deceleration are not misidentified as corrupted GPS reference data.

The GPS signals from the GPS receiver 42 on the line 56 and the wheel speed/rotation signals from the processor 60 are sent to a resampling and time synchronization processor 66 to synchronize the time frame between the GPS signals and the wheel speed/odometer readings so that the wheel sensor data stream is synchronized with the GPS data stream. Typically, vehicle sensor data is available at a higher sampling rate than GPS signals, and therefore, the GPS signal rate governs the rate of data sent to a GPS validation process. For example, GPS signals may be at 1 Hz and vehicle sensor data may be at 10 Hz or higher.

The time synchronized GPS signals and wheel speed/rotation signals from the processor 66 are sent to a GPS reference data validation processor 68 along with the acceleration estimation signals from the processor 62. The processor 68 selects valid GPS reference data that fulfills certain requirements for sensor calibration. The output of the processor 68 is a signal identifying whether the GPS signals for a particular period of time are valid or not. In one non-limiting embodiment, the algorithm uses a model based on equation (2) below to provide the validation of the GPS reference data in the processor 68.

$$\left|\frac{v_{i,GPS}}{v_{i,sensor}}\right| \leq ka_i \quad (2)$$

Where k is a predefined constant depending on the GPS receiver used, and $\alpha_i$ is the vehicle acceleration estimated by wheel data time differencing.

The yaw-rate sensor signals on the line 58 and the valid GPS signals from the processor 68 are sent to a bias and scale calibration processor 70. The processor 70 uses the valid GPS signals to remove the bias and calibrate the scale factor of the yaw-rate sensor 46 so that the yaw-rate sensor 46 can be used for vehicle heading purposes when the GPS signals are not valid. In one embodiment, the calibration algorithm used in the processor 70 treats the GPS heading profile and the yaw-rate heading profile as two shapes, i.e., generated by time integrating the yaw-rate signal, and attempts to estimate the bias and scale factors so that a minimum is reached in the model. This process is shown by equation (3) below.

$$\min_{S,B} \sum_{i=1}^{N} \alpha_i^2 (GPS_i - S \times (Sensor_i - B)) \quad (3)$$

Where N is the number of data points, $\alpha_i$ is the relative importance of epoch i, $GPS_i$ is the GPS heading (time=i), S is the scale factor, B is yaw bias and $Sensor_i$ is the yaw-based heading derived, for example, using Equation (6) below (time=i).

The model given by equation (3) also allows the inclusion of relative importance weights for individual observations in the calibration data set. For example, if several erroneous heading observations are detected in the GPS heading dataset, i.e., detected using continuity of GPS heading data, vehicle dynamic constraints and yaw-rate based heading, which has a much greater continuity, those data points can be assigned less weights or even be ignored in the parameter optimization process.

Prior to optimizing the model of equation (3), the algorithm establishes two search spaces for the bias and scale parameters. Based on the heading discrepancy between the GPS readings and yaw-rate based heading estimation using the perfect yaw-rate sensor assumption, the algorithm estimates a bias value and defines a search space around this approximated bias. It also picks identifiable vehicle turns, such as by using uncalibrated yaw-rate signals, and estimates an approximate scale factor along with an error estimate resulting in a search space for the scale factor. Subsequently, a search is performed to estimate the optimum bias and scale factor values.

The actual implementation of the calibration algorithm may vary depending on the integration mechanism used for GPS signals and vehicle sensors. For example, vehicle heading derived from calibrated sensors may be fed back to a GPS position and velocity estimation processor in a complex implementation. In any implementation, frequent calibration of the sensor will improve the accuracy of the estimated heading. Ideally, the calibration will take place as a continuous process using the most recent segment of valid GPS data. However, this may be not feasible because of limited processing resources in a vehicle platform, thus requiring an automated scheme to trigger a new calibration update whenever valid reference data is available and when significant sensor bias or scale deviations are detected.

A model based on equations (4) and (5) below can be used to monitor significant variations in the heading reported by the validated GPS data segments and corresponding calibrated sensor data to trigger an update of the calibration parameters.

$$\max\left|\frac{\phi_{i,Sensor}}{\phi_{i,GPS}}\right| < \delta_{Scale} \quad (4)$$

$$\max|\varphi_{i,Sensor} - \phi_{i,GPS}| < \delta_{Bias} \quad (5)$$

Where $\phi_{Sensor}$ is the sensor-based heading (yaw-rate or differential odometry), $\phi_{GPS}$ is the GPS-based heading, $\delta_{Scale}$ is the scale factor threshold and $\delta_{Bias}$ is the bias threshold.

The wheel speed and/or rotation signals and the odometer signals are also sent to or can be used by a differential odometry processor 64. The differential odometry processor 64 uses the wheel rotation counts from the wheel speed sensors 32, 34, 36 and 38 to determine the vehicle heading based on the distance between two of the wheels, such as wheels 22 and 26 or 24 and 28. The bias and scale calibration algorithm in the processor 70 can also be used to calibrate the bias and scale of the differential odometry signals.

The bias and scale calibration factors from the processor 70 are then sent to a heading estimation processor 72 along with the yaw-rate signals on the line 58. The heading estimation algorithm used in the processor 72 estimates the vehicle heading using the yaw-rate signals that have been calibrated by the algorithm in the processor 70. In one non-limiting embodiment, the scale and bias factors can be used to estimate the calibrated yaw-rate sensor-based heading by using the model in equation (6) below.

$$\phi_i = \phi_{i-1} + S(\partial\phi_i - \Gamma)dT \quad (6)$$

Where $\phi$ is the yaw-rate sensor-based heading, $\partial\phi$ is the yaw-rate, S is the scale factor, $\Gamma$ is the bias factor and dT is the yaw rate sensor data interval (1/sampling rate).

If the yaw-rate signals are not available at any particular time, then the heading estimation processor 72 can use the heading signals from the odometry processor 64. Various things would cause the processor 72 not to use the yaw-rate sensor signals on the line 58, such as sensor failure. It is well known in the art to provide vehicle heading by the wheel speed of two front and rear wheels of a vehicle. However, as is well understood in the art, it is less accurate than providing vehicle heading using yaw-rate sensors.

The heading estimation from the processor 72 can then be used in any suitable system on the vehicle 20, such as a digital compass 74.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for determining the heading of a vehicle, said system comprising:
    a GPS receiver providing GPS signals indicating the position of the vehicle;
    a yaw-rate sensor for providing yaw-rate signals indicating the yaw-rate of the vehicle;
    an acceleration estimation processor for determining the acceleration of the vehicle and providing acceleration signals;

a GPS validation processor receiving the GPS signals, wheel speed or rotation signals and the acceleration signals, and determining whether the GPS signals are valid; and a bias and scale calibration processor responsive to the yaw-rate sensor signals and the GPS signals, said calibration processor providing bias and scale calibration factors for the yaw-rate sensor signals using the GPS signals if the validation processor determines that the GPS signals are valid.

2. The system according to claim 1 further comprising a wheel speed sensor for providing the wheel speed or rotation signals of the speed or rotation of wheels on the vehicle and a wheel-slip detection processor responsive to the wheel speed signals, said wheel-slip detection processor determining whether wheel-slip is present.

3. The system according to claim 2 wherein the wheel-slip detection processor uses the following equation to determine wheel-slip:

$$\left|\frac{v_{i,GPS}}{v_{i,sensor}}\right| \leq \delta$$

where $v_{GPS}$ is GPS-based velocity, $v_{sensor}$ is wheel sensor based vehicle velocity and $\delta$ is a predetermined data quality threshold.

4. The system according to claim 1 further comprising a heading estimation processor responsive to the bias and scale calibration factors from the calibration processor and the yaw-rate signals, said heading estimation processor using the calibration factors and the yaw-rate signals to provide vehicle heading.

5. The system according to claim 4 wherein the heading estimation processor uses the following equation to provide the vehicle heading:

$$\phi_i = \phi_{i-1} + S(\partial\phi_i - \Gamma)dT$$

where $\phi$ is the yaw-rate sensor-based heading, $\partial\phi$ is the yaw-rate, S is the scale factor, $\Gamma$ is the bias factor and dT is a yaw rate sensor data interval.

6. The system according to claim 1 wherein the GPS validation processor uses a ratio between velocity provided by the GPS signals and wheel speed or rotation signals to determine whether the GPS signals are valid.

7. The system according to claim 1 wherein the acceleration estimation processor uses time differentiation of wheel velocity to estimate the vehicle acceleration.

8. The system according to claim 1 wherein the bias and scale calibration processor uses the following equation to determine the bias and scale calibration factors:

$$\min_{S,B} \sum_{i=1}^{N} \alpha_i^2 (GPS_i - S \times (Sensor_i - B))$$

where N is the number of data points, $\alpha_i$ is the relative importance of epoch i, $GPS_i$ is the GPS heading (time=i), S is the scale factor, B is yaw bias and $Sensor_i$ is the yaw-based heading.

9. The system according to claim 1 further comprising a resampling and time synchronization processor that synchronizes the time frame between the GPS signals and wheel speed signals.

10. The system according to claim 1 further comprising a differential odometry processor for determining vehicle heading based on wheel rotation counts.

11. A system for calibrating bias and scale of a sensor in a vehicle, said system comprising:

a heading rate sensor providing sensor signals;

a GPS receiver providing GPS signals indicating the position of the vehicle;

a GPS validation processor receiving the GPS signals and determining whether the GPS signals are valid; and a bias and scale calibration processor responsive to the sensor signals from the heading rate sensor and the GPS signals, said calibration processor providing bias and scale calibration factors for the sensor signals from the heading rate sensor using the GPS signals if the validation processor determines that the GPS signals are valid.

12. The system according to claim 11 further comprising a heading estimation processor responsive to the bias and scale calibration factors from the calibration processor and the sensor signals from the heading rate sensor, said heading estimation processor using the calibration factors and the sensor signals from the heading rate sensor to provide vehicle heading.

13. A system for determining the heading of a vehicle, said system comprising:

a GPS receiver providing GPS signals indicating the position of the vehicle;

a yaw-rate sensor for providing yaw-rate signals indicating the yaw-rate of the vehicle;

a plurality of wheel speed/wheel rotation sensors for providing signals of the wheel speed or wheel rotation of wheels on the vehicle;

a wheel-slip detection processor responsive to the wheel speed or wheel rotation signals and determining whether any of the wheels have wheel-slip;

an acceleration estimation processor for determining the acceleration of the vehicle based on the wheel speed or wheel rotation signals;

a GPS validation processor receiving the GPS signals and the acceleration signals, and determining whether the GPS signals are valid;

a bias and scale calibration processor responsive to the yaw-rate sensor signals and the GPS signals, said calibration processor providing bias and scale calibration factors for the yaw-rate sensor signals using the GPS signals if the validation processor determines that the GPS signals are valid; and a heading estimation processor responsive to the bias and scale calibration factors from the calibration processor and the yaw-rate signals, said heading estimation processor using the calibration factors and the yaw-rate signals to provide vehicle heading.

14. The system according to claim 13 wherein the wheel-slip detection processor uses the following equation to determine wheel-slip:

$$\left|\frac{v_{i,GPS}}{v_{i,sensor}}\right| \leq \delta$$

where $v_{GPS}$ is GPS-based velocity, $v_{sensor}$ is wheel sensor based vehicle velocity and $\delta$ is a predetermined data quality threshold.

15. The system according to claim 13 wherein the heading estimation processor uses the following equation to provide the vehicle heading:

$$\phi_i = \phi_{i-1} + S(\partial \phi_i - \Gamma) dT$$

where $\phi$ is the yaw-rate sensor-based heading, $\partial \phi$ is the yaw-rate, S is the scale factor, $\Gamma$ is the bias factor and dT is a yaw rate sensor data interval.

16. The system according to claim 13 wherein the GPS validation processor uses a ratio between velocity provided by the GPS signal and the wheel speed or rotation signals to determine whether the GPS signals are valid.

17. The system according to claim 13 wherein the acceleration estimation processor uses time differentiation of wheel velocity to estimate the vehicle acceleration.

18. The system according to claim 13 wherein the bias and scale calibration processor uses the following equation to determine the bias and scale calibration factors:

$$\min_{S,B} \sum_{i=1}^{N} \alpha_i^2 (GPS_i - S \times (Sensor_i - B))$$

where N is the number of data points, $\alpha_i$ is the relative importance of epoch i, $GPS_i$ is the GPS heading (time=i), S is the scale factor, B is yaw bias and $Sensor_i$ is the yaw-based heading.

19. The system according to claim 13 further comprising a resampling and time synchronization processor that synchronizes the time frame between the GPS signals and wheel speed signals.

20. The system according to claim 13 further comprising a differential odometry processor for determining vehicle heading based on wheel rotation counts.

* * * * *